(12) United States Patent
Meyn

(10) Patent No.: US 7,968,045 B2
(45) Date of Patent: Jun. 28, 2011

(54) INSTALLATION FOR PRODUCTION OF SECONDARY STEEL BASED ON SCRAP

(75) Inventor: Matthias Meyn, Hilden (DE)

(73) Assignee: SMS Siemag Aktiengesellschaft, Duesseldorf (DE)

( * ) Notice: Subject to any disclaimer, the term of this patent is extended or adjusted under 35 U.S.C. 154(b) by 0 days.

(21) Appl. No.: 12/798,421

(22) Filed: Apr. 1, 2010

(65) Prior Publication Data

US 2010/0258985 A1     Oct. 14, 2010

Related U.S. Application Data

(62) Division of application No. 11/659,430, filed on Jan. 31, 2007, now Pat. No. 7,717,978.

(51) Int. Cl.
*C21C 5/40* (2006.01)
*C21C 7/072* (2006.01)

(52) U.S. Cl. ........ 266/155; 266/156; 266/157; 266/176; 266/901

(58) Field of Classification Search .......... 266/155–157, 266/176, 901
See application file for complete search history.

(56) References Cited

U.S. PATENT DOCUMENTS

| | | | | |
|---|---|---|---|---|
| 5,000,425 | A | * | 3/1991 | Brändström .................... 266/44 |
| 5,500,032 | A | * | 3/1996 | Nieder et al. .................... 75/414 |
| 5,520,372 | A | * | 5/1996 | Pohl .............................. 266/155 |

\* cited by examiner

*Primary Examiner* — George Wyszomierski
*Assistant Examiner* — Tima M McGuthry-Banks
(74) *Attorney, Agent, or Firm* — Abelman, Frayne & Schwab

(57) ABSTRACT

An installation for production of the secondary steel based on scrap in which the scrap (10) is fed in a scrap preheater (2) through a charging device (1), is preheated there and, finally, is brought into a smelting unit (3) and is melted there with primary energy only, the process gases (19), which leave the smelting unit (3), are not used for directly preheating the scrap (10) but are rather used indirectly by heating a gaseous preheatable medium, e.g., air (18) or inert gas, whereby energetic, fluidic, and spatial decoupling of preheating and melting and of post-combustion and preheating is achieved.

1 Claim, 4 Drawing Sheets

INSTALLATION FOR PRODUCTION OF SECONDARY STEEL BASED ON SCRAP

RELATED APPLICATION

This application is a divisional of application Ser. No. 11/659,430 filed Jan. 31, 2007 now U.S. Pat. No. 7,717,978.

BACKGROUND OF THE INVENTION

1. Field of the Invention

The invention relates to an installation for production of secondary steel based on scrap, wherein the scrap is fed in a scrap preheater through a charging device, is heated there and, finally, is brought in a smelting unit and is melted, wherein process gas which leaves the smelting unit, is used for preheating of the scrap, is freed of harmful materials and dust in a reheating device and in an adjoining dedusting installation, respectively, and is discharged from the installation as a cooled cleaned flue gas.

2. Description of the Prior Art

In such an installation, the scrap is fed through a charging device in a preheater which, as a rule, is heated directly with a hot flue gas from a smelting unit, e.g., electrical arc furnace. It is mostly aspirated through the preheater, heating the scrap. The flue gas is cooled off. The preheated scrap (dependent on the process, to about 600-800° C.) is then transferred in a smelting unit and is melted with electrical energy. In addition, a fossil energy carrier (natural gas, coal, oil) is also used. As oxidation means, as a rule, technical oxygen (>95% by volume of $O_2$) is used. As additives for forming the flux, mostly mineral products (lime, dolomite) are used.

Dependent on the process conditions, the parameters (temperature, composition, oxygen content, dust content, amount) of the flue gas (process gas), which is produced during the melting process, are subjected to strong variations. In addition, the melting process is not continuous but rather discrete (batch operation).

The scrap contains, dependent on quality, type, and provenance, other accompanying products. The composition and amount of these mostly hydrocarbon-containing accompanying products (oils, fatty products, cooling and lubrication materials, coatings, etc.) differs to a very large degree.

The changeable flue gas values result, therefore, in strong variations of the operational parameters of the preheaters. This leads to undefined and non-stationary oxidation conditions of accompanying products which cling to the scrap. This is favorable to the formation of undesired flue gas components (CO, non-combusted hydrocarbons, aromates, chloride, . . . ). Those are produced mostly during evaporation and/or (partial) oxidation of the components clinging to the scrap.

In order to meet the legal requirements, an expensive flue gas treatment is necessary to eliminate and separate the non-combusted hydrocarbons and dioxins/furans. To this end, the flue gas is heated, after being discharged from the preheater, in a reheating chamber to a T>850° C. and after a certain dwell time of t>2 c is rapidly cooled to about 200° C. (is quenched). Thereby the new formation (denovo-syntheses) of dioxins/furans (PCDD/F) should be suppressed. In a following process stage, separation of the residual PCDD/F takes place by injection of, e.g., lignite-coke dust (entrained-phase adsorption). The injected coke dust then is separated, together with the conventional fine dust, in a dedusting installation.

This type of a process insures maintaining of emission threshold for PCDD/F of 0.01 ng TE/Nm³ but, however, is associated with increased additional expenses (for the primary energy for the burner, cooling water for quenching, waste water treatment system for quenching, silo, metering and delivery technique for the coke dust, etc.). In addition, the coal content in the filtered dust is increased above the permitted limit so that a thermal secondary treatment of the filtered dust before depositing is necessary.

The sum of these expenses exceeds the advantages (saving of electrical energy, increase of the productivity) that could have been expected from the use of the scrap preheating system. In addition, additional devices become responsible for additional disturbances in the installation.

In order to minimize these drawbacks, WO 03/068995 A1 suggests a smelting installation for a continuous production of steel with the use of metallic materials. The used materials such as, e.g., scrap, steel sponge or the like, are preheated in an upper part of a smelting vessel, which is formed as a shaft, and then are melted in its lower portion of the vessel with fossil fuels. The produced melted product is continuously fed in an adjacently arranged treatment vessel which is formed as an electrical arc furnace, and is brought there to the desired steel quality with electrical energy. For post-combustion, the post-combustion gases are delivered in different planes in the material column from outside and from inside through an inner shaft extending in the middle of the material column and with which a staged post-combustion of the ascending process gases is achieved, together with the reduction of oxidation of the iron-containing initial material.

With this known process, only the primary energy is used for melting the scrap. In order to prevent oxidation of iron, heating in the melting stage should be carried out non-stoichiometrically with an air ratio in a range 0.5-0.9. Therefore, the flue gas contains, after leaving a separate melting stage, still a large amount of combustible components (in particular $CO$, $H_2$ and $CH_4$). This results in a poor use of the used energy carrier. Therefore, further measures are necessary in order to improve the energy use which results in increased costs. To this end, there is provided means for feeding the reheating air in the shaft above the melting zone (integrated after burning). This measure improves the energy use, however, for different reasons, probably, no complete conversion of non-combusted materials in the shaft is possible. Moreover, the flue gas should be withdrawn at the shaft outlet with a temperature about 800° C. in order to prevent an additional post-combustion stage.

It is an object of the invention to provide an installation with which the described drawbacks of the preheating and melting with an exclusive use of primary energy, are reliably prevented or at least are minimized.

SUMMARY OF THE INVENTION

The set object is achieved with an installation including a charging device, a scrap preheater located downstream of the charging device; a smelting unit for melting scrap and located downstream of the preheater; a reheating device; a conduit connecting the reheating device with the smelting unit for feeding a process gas generated in the smelting unit directly into the preheating device for reheating the process gas therein, a heat exchanger located downstream of the reheating device for cooling the reheated process gas and for heating fresh gas which is fed in the preheater; a dedusting installation located downstream of the heat exchanger for dedusting the cooled process gas and an adsorbtion device located downstream of the preheater and upstream of the reheater for freeing a warm gas that leaves the preheater free from harmful material and for feeding a gas freed from harmful material to the reheating device.

Thus, the present invention provides a post-combustion-cooling-separation of harmful materials-dedusting the system with a sequence:

Harmful material separation-Post-combustion-Cooling-Dedusting.

The flue gas, which is referred to as a process gas, according to the invention, is not used directly from the melting stage for preheating the scrap, i.e., the preheating is carried out not immediately with the process gas from the melting stage but rather with a further gaseous preheating medium, e.g., air, oxygen-enriched air, or inert gas.

The process gas is fed directly to the post-combustion stage with admixing of combustion oxygen. Thereby, with the use of reliable metering and regulating devices, a controlled and complete conversion of all of combustible components is insured. It is also possible, alternatively, to feed back a portion of the process gas directly to the melting stage, without a further aftertreatment.

A hot flue gas after post-combustion is used in a heat exchanger for preheating of the preheating medium and is, thereby, cooled.

With the use of a heat exchanger instead of a quencher, the inventive thermal, energetic and spatial decoupling of process stages: melting-preheating and post-combustion-preheating.

An additional degree of freedom with regard to conducting the process is obtained, while only regulation of the hot air temperature at the entrance of the preheating stage is possible. This can be effected by changing the air ratio in the post-combustion stage, by changing the amount of air, or by a combination of both measures. In addition, the heating of the melting stage can be controlled independently of the post-combustion or of the scrap preheating.

The preheating medium, which was produced with the flue gas in the heat exchanger can flow in the same direction or in the opposite direction in the preheater. Because both the amount and temperature of the oxygen content can be maintained constant, constant stationary operational condition can be retained in the preheating stage. Thereby, the scrap preheating temperature before charging can also be maintained constant.

With constant operational conditions in the preheating stage (sufficiently high hot air temperature, constant $O_2$—content or clear surplus of oxygen), all of the undesirable accompanying materials are converted into a gas in a completely oxidized condition. With a high oxygen surplus, no carbonization/coking reaction take place, whereby formation of precursor substances for PCDD/F is effectively prevented. The volatile substances are carried away from the preheater together with the preheating medium.

The waste air loaded with harmful materials is treated in an adsorber. There, the harmful materials are converted from a gas phase into a porous solid phase and are, thus, concentrated adsorbent. In particular, active coke on the basis of brown coke (hearth furnace coke (HOK)) or special adsorbent mixtures are suitable as adsorbent. Very good precipitation behavior of HOK for organic substance and alkalis is known from its use in different fields (in particular in refuse combustion installations—smoky gas cleaning). The loaded adsorbent either is completely removed from the process or is partially recirculated into the melting stage.

The cleaned preheating medium as soon as it is enriched with oxygen, is used for post-combustion of the process gas. Dependent on the process gas parameters, a supporting heating can be necessary.

The scrap after leaving the preheater is "clean", i.e., all of clinging hydrocarbons were converted into a gas phase. Thereby, the loading of the process gas with dust at the outlet of the melting stage, in comparison with a conventional process, is substantially prevented.

In comparison with a conventional process, secondary or spatial dedusting can be dispensed with as all of the components can be made gastight. This permits a noticeable reduction in the to-be-treated flue gas amount and, thereby, of the size of separate installation components. Due to the inventive energy decoupling of process stages melting-preheating-post-combustion, the process can be conducted with high flexibility and, simultaneously, with high energy efficiency.

According to the invention, additional bypass conduits can be provided in the hot air loop in order to improve the temperature control of the entire process:

Admixing of cold air to the warm air, which is loaded with harmful materials, at the outlet of the scrap preheater for controlling the entry temperature in the adsorbtion device.

Returned of the clean warm air directly in the fresh air stream in front of the heat exchanger for controlling the temperature in the reheating device.

Use of a portion of the hot air as oxidation means for the smelting unit. The feeding can be effected directly in the melting zone.

Use of a portion of the hot air as oxidation means for post-combustion. Thereby, the flue gas temperature can be increased or retained constant at a low residual calorific value or at a small amount of the process gas (small melting capacity). This expansion is advantageous for carrying out the process, starting from a cold condition for rapidly reaching the production temperature.

According to an alternative embodiment of the invention, a further or other medium (e.g., inert gas) can be used as a preheating medium for scrap, wherein the post-combustion air, which is necessary for post-combustion of the process gas, is heated in a second heat-exchanger. The further or other preheating medium then is circulated in closed loop between the installation components Heat Exchanger-Scrap Preheater-Adsorbtion Device.

Thereby, a most possible decoupling of the combustion stage from the preheating stage is effected, whereby high scrap temperatures at the outlet of the preheater can be realized. This results in that technical and economical limits of the process can be set as a result of ever diminishing oxidation with increase of the gas temperature.

Further particularities of the basic principle of the invention will be explained below in detail with reference to flow charts shown in the drawings. The flow charts include only the process steps and material flows which are necessary for understanding of the invention. Thus, cooling water flows, coarse dust and spark separator as well as devices for space dedusting are, e.g., mostly missing.

BRIEF DESCRIPTION OF THE DRAWINGS

The drawings show:

FIG. 1 shows a simplified basic flow chart of a typical flue gas cleaning of a melting process with scrap preheating. Scrap 10 is fed to a scrap preheater 2 through a charging device 1 and is heated there with process gas 19 of a smelting unit 3. The heated scrap 10 is then fed in the smelting unit 3 where it is melted with addition of oxygen 20 and additives 13, by a fossil and/or electrical energy, and leaves the smelting unit 3 as melt 11 and flux 12.

Figure 1:
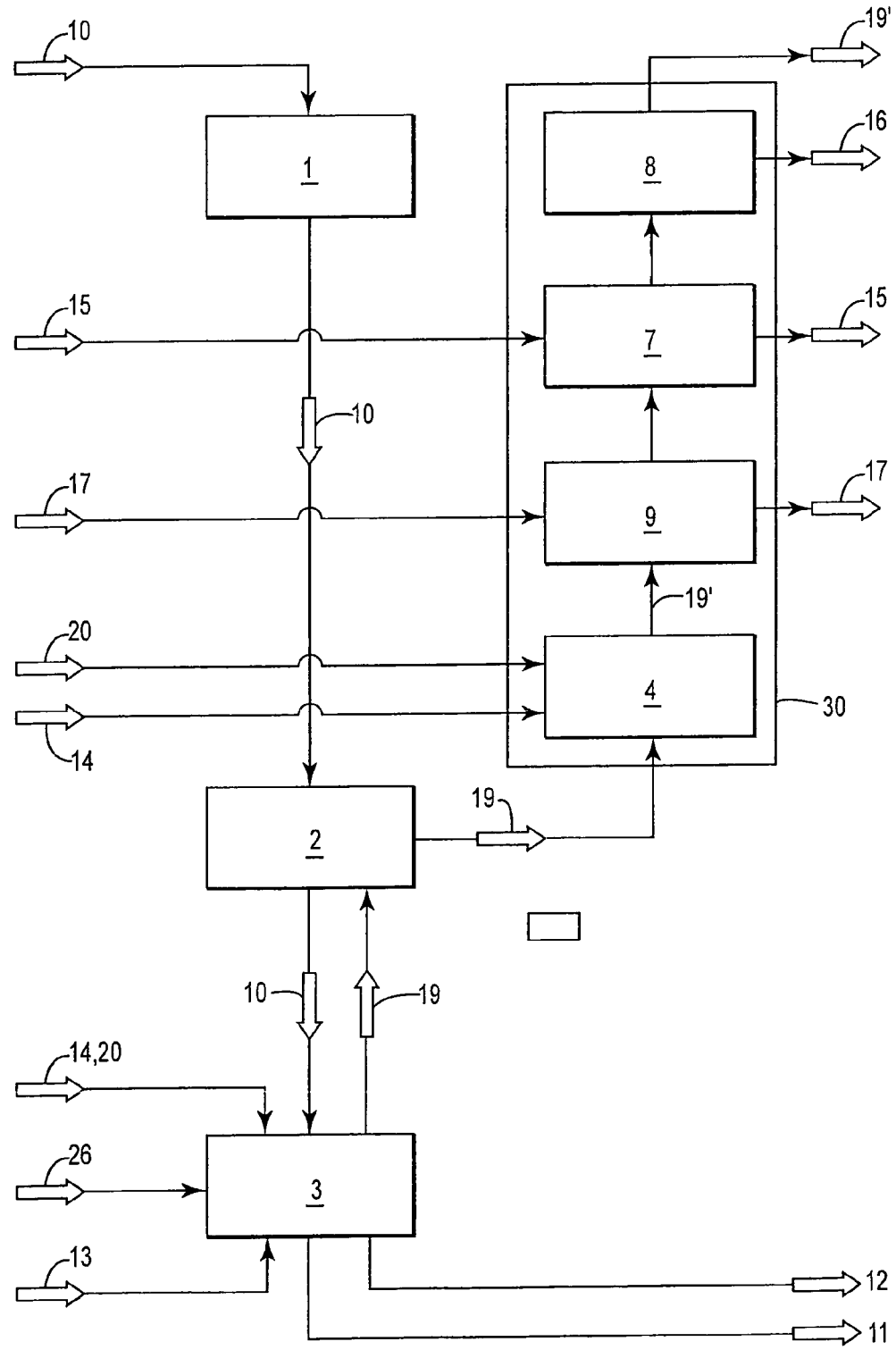
FIG. 1 a simplified scheme of a typical preheating and flue gas treatment step of a melting process with scrap preheating according to the state of the art.

After leaving the scrap preheater 2, the process gas 19 is fed to a flue gas treatment system 30 where it is reheated, with addition of oxygen 20, by fossil energy 14. The flue gas 19', which was produced in the reheating unit 4, is then cooled in a cooling device 9 with water 17, is freed from harmful materials in an adsorbtion device 7 by addition of an adsorbent 15 and, finally, is separated from dust 16 in a dedusting apparatus 8.

Figure 2:
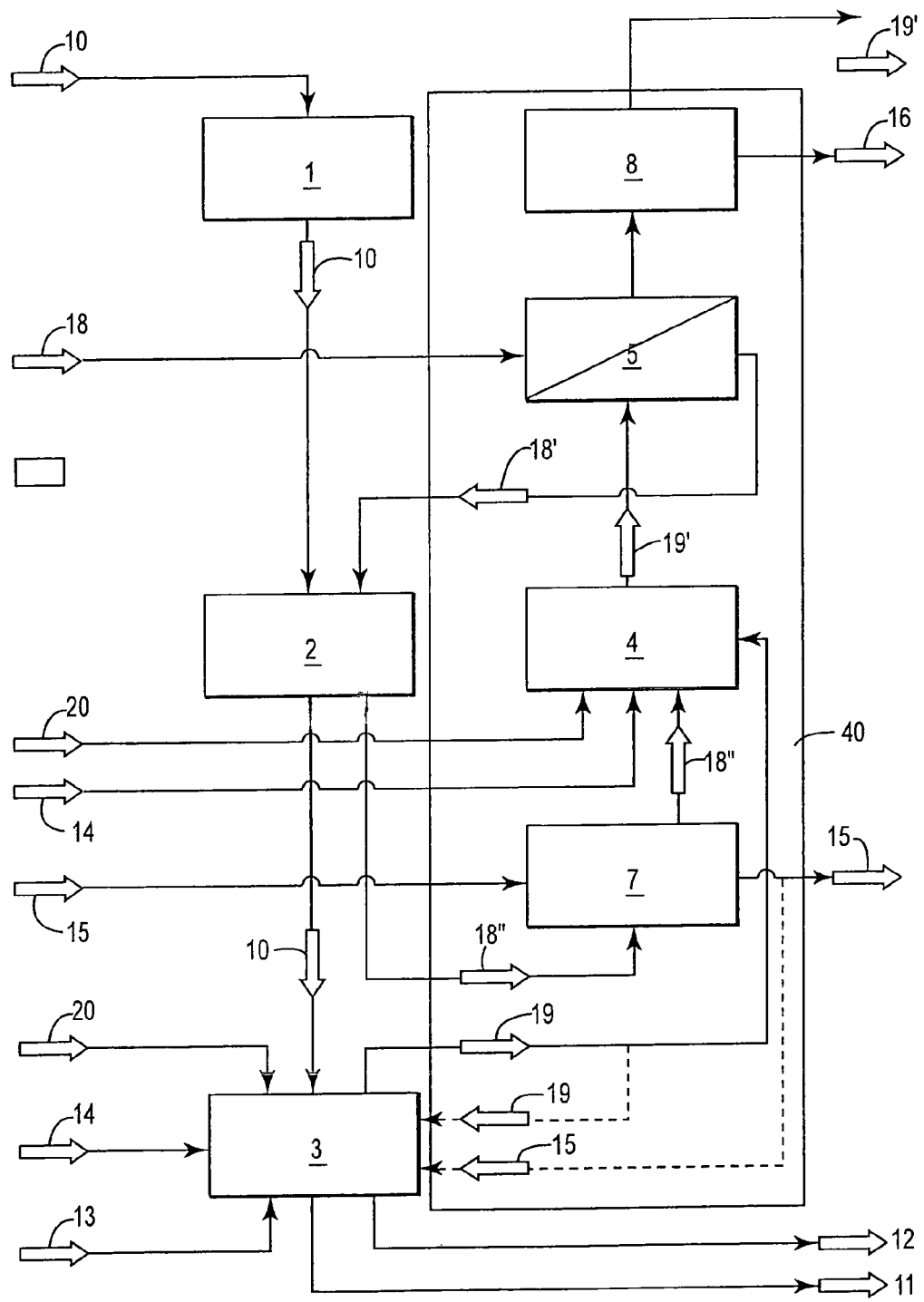
FIG. 2 a simplified scheme of the open preheating and flue gas treatment step of the melting process with scrap preheating according to the invention.

FIG. 2 shows a simplified scheme of an inventive flue gas treatment system 40 with an open preheating and flue gas treatment of the melting process with scrap preheating. Here likewise, the scrap 10 is fed in the preheater 2 through a charging device 1 but is not directly heated there any more by the process gas 19 of the smelting unit 3, but is heated indirectly by hot air 18' that is produced in a heat exchanger 5 as a result of heating of air 18 with the process gas 19. As in FIG. 1, the hot scrap 10 is fed in the smelting unit 3 where it is melted, with addition of additives and, if necessary, of adsorbent loaded with harmful materials, of oxygen and, if necessary, of returned process gas 19, exclusively by fossil energy into melt 11 and flux 12.

After leaving the scrap preheater 2, the process gas 19 is fed to a flue gas treatment system 40 according to the present invention where it is likewise post-combusted in the reheating unit 4 by fossil energy 14 with addition of oxygen 20 and of cleaned warm air 18" from the adsorbing device 7. The produced heated flue gas 19' is fed in the heat exchanger 5 where it heats fresh air 19, and is finally freed from dust 16, in the dedusting device 8.

The open circulation of the preheated air 18 is carried out as follows: air 18, which is heated in the heat exchanger 5 to hot air 18', is fed into the scrap preheater 2 and leaves it as a warm air 18" loaded with harmful materials, is freed from harmful materials in the adsorbing device 7 by the introduced adsorbent 15, and then is used in the reheating device 4 as oxidation means for the process gas 19. Further, treatment of the warm air 18" is carried out, together with the process gas 19, as flue gas 19' in a manner that has already been described above.

Figure 3:
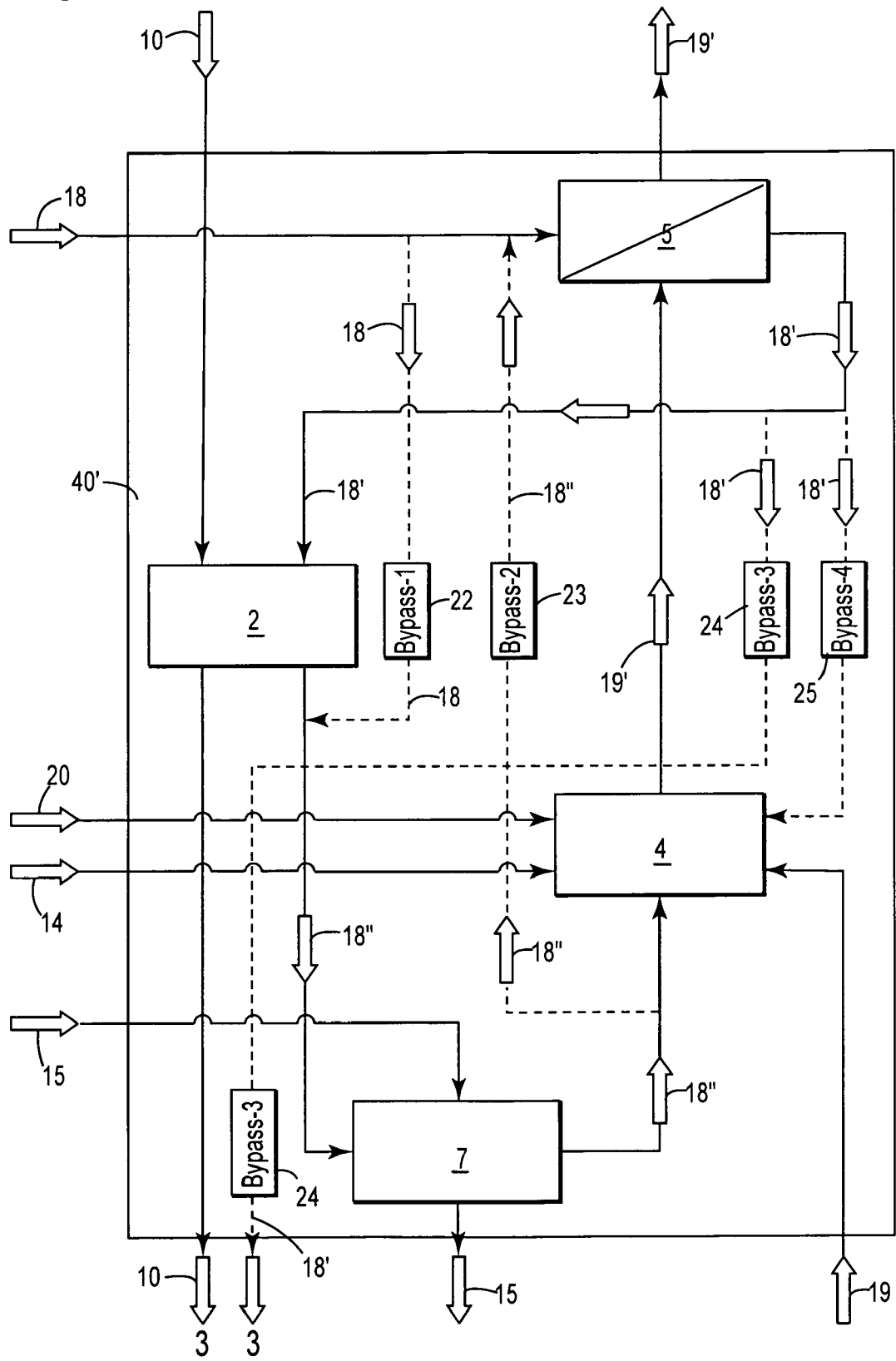
FIG. 3 portion of a basic flow chart of FIG. 2 showing preheating and flue gas treatment expanded by the use of bypass conduits.

FIG. 3 shows a portion of the flue gas treatment system 40 of FIG. 2 which is expanded with a scrap preheater 2 and separate bypasses 22, 23, 24, 25 for a better regulation of the temperature in the air circulation path. In the so expanded flue gas treatment system 40' with a bypass 22, fresh air 18 is admixed to the warm air 18" loaded with harmful materials before feeding it in the reheating device 4, a bypass 23, the warm air 18" which is freed from harmful materials, is admixed to the fresh air 18, a bypass 24, the hot air 18', which was produced in the heat exchanger 5, is fed directly to the smelting unit 3, a bypass 25, the hot air 18', which was produced in the heat exchanger 5, is fed directly in the device 4.

Thus, bypasses 22, 23, 24, 25 permit to additionally influence the temperature control of the separation of harmful materials, of air heating, of melting, and post-combustion in a simple way.

Figure 4:
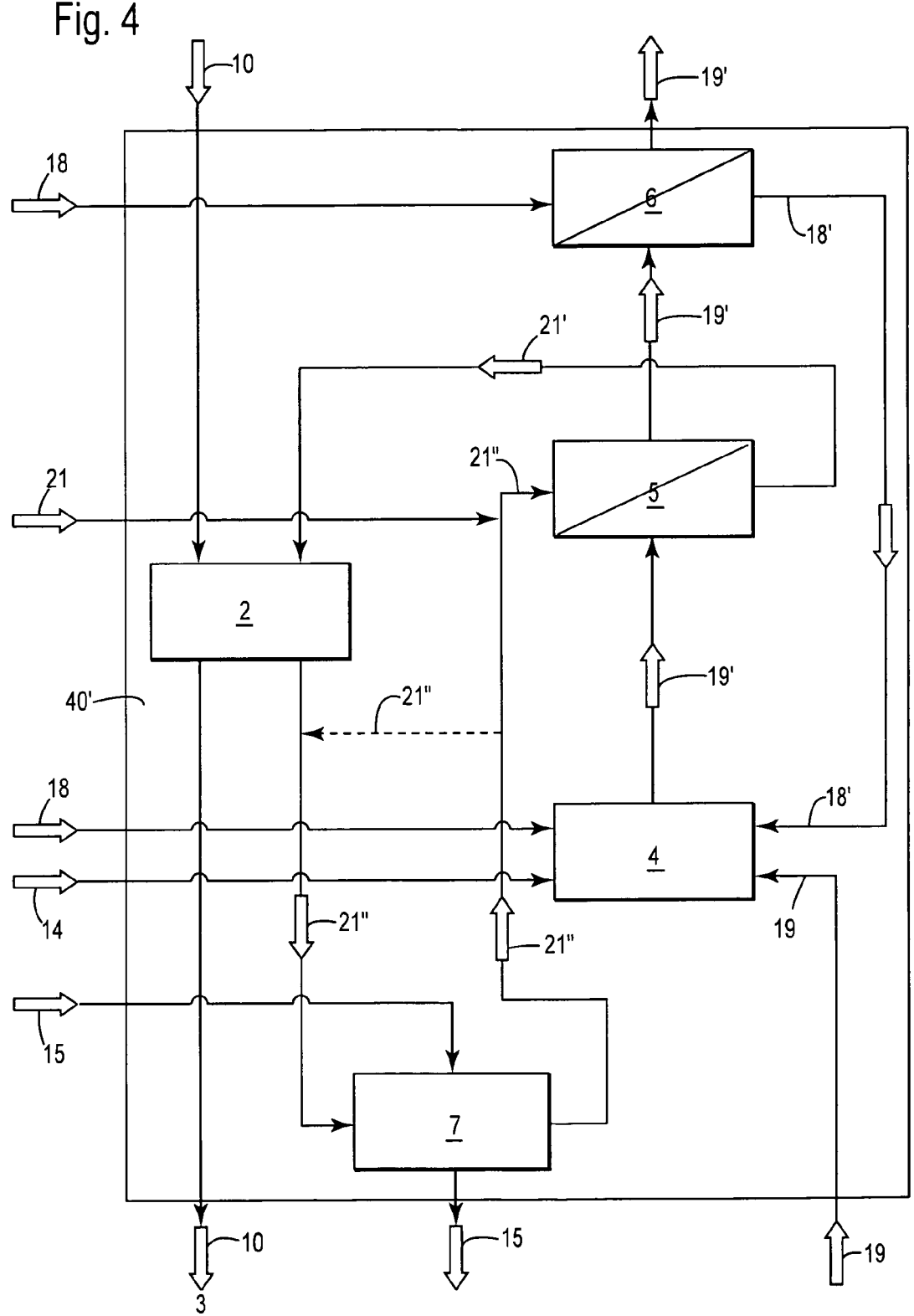
FIG. 4 An alternative scheme of preheating and flue gas treatment with a closed circulation of the preheating medium and a separate preheating of the post-combustion air.

FIG. 4 shows an alternative scheme of preheating and flue gas treatment in an inventive flue gas treatment system 40' with a closed loop for the preheating medium and separate preheating of the post-combustion air. In the shown embodiment, as a preheating medium, an inert gas 21, which is heated to a hot gas 21' in the heat exchanger 5, is used and which is fed in a closed loop to the heat exchanger 5 after heating the scrap and a subsequent separation of harmful materials. If necessary, with this process, it is also possible to return (see the dash line in FIG. 4) a partial amount of the warm gas 21" which is freed from harmful materials, before its renewed heating, to the warm gas 21" loaded with harmful materials.

Thus, air 18, which is necessary for reheating, is completely separated from the preheating medium, the hot gas 21' and, therefore, is heated to the hot air 18' in a separate heat exchanger 6.

The method of the invention and the installation for its implementation are not limited to the shown embodiments; rather, separate installation components and the connection conduit systems can be arranged differently or expanded by a specialist in accordance with the existing conditions. The inventive energetic, fluidic, and spatial separation of preheating and melting and of post-combustion and preheating should be retained in each case.

What is claimed is:

1. An installation for production of secondary steel based on scrap, comprising a charging device (1); a scrap preheater (2) located downstream of the charging device (1); a smelting unit (3) for melting scrap and located downstream of the preheater (2); a reheating device (4); a conduit connecting the reheating device (4) with the smelting unit (3) for feeding a process gas generated in the smelting unit (3) directly into the reheating device (4) for reheating the process gas therein; a heat exchanger (5) located downstream of the reheating device (4) for cooling the reheated process gas and for heating fresh gas which is fed in the preheater (2); a dedusting installation (8) located downstream of the heat exchanger (5) for dedusting the cooled process gas; and an adsorbtion device (7) located downstream of the preheater (2) and upstream of the reheating (4) for freeing a warm gas that leaves the preheater (2) free from harmful material and for feeding a gas freed from harmful material to the reheating device (4).

* * * * *